(12) United States Patent
Pareek (10) Patent No.: US 8,892,579 B2
(45) Date of Patent: Nov. 18, 2014

(54) METHOD AND SYSTEM OF DATA EXTRACTION FROM A PORTABLE DOCUMENT FORMAT FILE

(76) Inventor: Anu Pareek, Fremont, CA (US)

( * ) Notice: Subject to any disclaimer, the term of this patent is extended or adjusted under 35 U.S.C. 154(b) by 79 days.

(21) Appl. No.: 13/456,949

(22) Filed: Apr. 26, 2012

(65) Prior Publication Data

US 2013/0290270 A1   Oct. 31, 2013

(51) Int. Cl.
  *G06F 17/30* (2006.01)
  *G06F 7/00* (2006.01)
(52) U.S. Cl.
  USPC ............ 707/755; 707/708; 707/769; 715/243
(58) Field of Classification Search
  None
  See application file for complete search history.

(56) References Cited

U.S. PATENT DOCUMENTS

| | | | | |
|---|---|---|---|---|
| 2008/0252924 | A1* | 10/2008 | Gangai | 358/1.15 |
| 2010/0318561 | A1* | 12/2010 | Dunie et al. | 707/769 |
| 2011/0161333 | A1* | 6/2011 | Langseth et al. | 707/755 |
| 2011/0289106 | A1* | 11/2011 | Rankin et al. | 707/769 |
| 2011/0289161 | A1* | 11/2011 | Rankin et al. | 709/206 |
| 2012/0011428 | A1* | 1/2012 | Chisholm | 715/230 |
| 2012/0096036 | A1* | 4/2012 | Ebaugh et al. | 707/780 |
| 2012/0253852 | A1* | 10/2012 | Pourfallah et al. | 705/4 |
| 2012/0266219 | A1* | 10/2012 | Coleman et al. | 726/6 |
| 2013/0011062 | A1* | 1/2013 | Conwell et al. | 382/173 |
| 2013/0124979 | A1* | 5/2013 | Chang et al. | 715/243 |

* cited by examiner

*Primary Examiner* — Dung K Chau (57) ABSTRACT

In one exemplary embodiment, a computer-implemented method includes receiving a portable digital format (PDF) file. A text element file is generated. The text element file includes a text element of the PDF file and a coordinate location of the text element. A document type of the PDF file is determined. A property file is selected according to the document type of the PDF. The property file includes at least one property. The property includes a definition of a data element to be extracted from the PDF file. The property includes a definition of a data element value, as well. The property includes a rule for locating the data element value relative to the data element. The data element and the data element value are extracted from the text element file according to the property.

15 Claims, 12 Drawing Sheets

FIGURE 1

```
<?xml version="1.0" encoding="UTF-8"?>
<document>

<span y="57" endX="654" x="541" globalY="10057">Investment Report</span>
<span y="81" endX="650" x="541" globalY="10081">April 1, 2011 - April 30, 2011</span>
<span y="117" endX="562" x="541" globalY="10117">Online</span>
<span y="117" endX="690" x="690" globalY="10117"> </span>
<span y="321" endX="597" x="576" globalY="10321">Number</span>
<span y="321" endX="627" x="627" globalY="10321"> </span>
<span y="321" endX="671" x="639" globalY="10321">April 1, 2011</span>
<span y="321" endX="706" x="706" globalY="10321"> </span>
<span y="321" endX="748" x="713" globalY="10321">April 30, 2011</span>
<span y="335" endX="176" x="71" globalY="10335">Beginning value as of Apr 1</span>
<span y="335" endX="220" x="220" globalY="10335"> </span>
<span y="335" endX="283" x="243" globalY="10335">$62,111.37</span>
<span y="345" endX="387" x="306" globalY="10345">General Investment</span>
<span y="347" endX="177" x="71" globalY="10347">Change in investment value</span>
<span y="347" endX="228" x="228" globalY="10347"> </span>

<span y="272" endX="473" x="473" globalY="20272"> </span>
<span y="272" endX="518" x="501" globalY="20272">51.99</span>
<span y="284" endX="325" x="306" globalY="20284">Total</span>
<span y="284" endX="396" x="396" globalY="20284"> </span>
<span y="284" endX="441" x="418" globalY="20284">$95.01</span>
```

```
•
•
•
<Property Name="AccountNumber">
<Type>
AccountNumber
</Type>
<DataType>
TEXT
</DataType>
<DataFormat>
<![CDATA[*]]>
</DataFormat>
<SynonymList>
<Synonym>
Fidelity
</Synonym>
</SynonymList>
<RegularExpressionList>
<RegularExpression Name="fidelityAccountNumber">
<![CDATA[[a-zA-Z0-9]{3}[-][0-9]{6}]]>
</RegularExpression>
</RegularExpressionList>
<PageList>
1;
</PageList>
<SearchCriteria BeginSearchTag="" EndSearchTag="" SearchScope="Page"
StopAfterNumMatches="1" OccurrenceOnPage="1"/>
<ExtractedLinesCriteria BeginFromLine="0" ExtractNumLines="20"/>
<ValidationMethod useCustomMethod="false" methodList="consolidateLineUseRegex;"/>
</Property>
•
•
•
```

MikeSosa Investment Account:BeginningBalance:$72,111.38

MikeSosa Investment Account:ChangeInValue:$3,269.89

MikeSosa Investment Account:EndingBalance:$75,381.27

MikeSosa Investment Account:StatementBeginDate:2012-03-01

MikeSosa Investment Account:StatementDate:2012-03-30

MikeSosa Investment Account:StatementPeriod:April 1, 2012 - April 30, 2012

METHOD AND SYSTEM OF DATA EXTRACTION FROM A PORTABLE DOCUMENT FORMAT FILE

BACKGROUND

1. Field

This application relates generally to data extraction, and more specifically to a system and method for data extraction from a portable document format (PDF) file.

2. Related Art

PDF is a format for storing, viewing and publishing digital content. A PDF file can include different types of data (e.g. text, bitmaps, and images). A PDF file can be composed of a sequence of pages. Each page can include text elements, graphics objects and external image objects. A text element can include characters, position information and font information. Graphics objects include information about lines and curves. External image objects contain information about rectangular images.

The content of a PDF file is not guaranteed to be a correct logical representation of the text. For example, the various objects included in the document are not guaranteed to be in a user-readable order and/or some other logical order. This is due to the fact that the content can be optimized in order to be rendered efficiently on the screen or for printing rather than for parsing and extraction. For example, all text of a particular font might be grouped together in file regardless of where it occurs on the page itself.

BRIEF SUMMARY OF THE INVENTION

In one exemplary embodiment, a computer-implemented method includes receiving a PDF file. A text element file is generated. The text element file includes a text element of the PDF file and a coordinate location of the text element. A document type of the PDF file is determined. A property file is selected according to the document type of the PDF. The property file includes at least one property. The property includes a definition of a data element to be extracted from the PDF file. The property includes a definition of a data element value, as well. The property includes a rule for locating the data element's value relative to the data element. The data element and the data element's value are extracted from the text element file according to the property.

Optionally, a data element list including the data element and the data element's value can be generated. The text element file can be searched for a keyword. The key word can indicate the document type. The text element file can be an extensible markup language (XML) file. The property file can be an XML file. A property can include a rule for locating the data element value according to a location of the data element's value relative to the coordinate location of the data element.

BRIEF DESCRIPTION OF THE DRAWINGS

The present application can be best understood by reference to the following description taken in conjunction with the accompanying figures, in which like parts may be referred to by like numerals.

FIGS. 8 A-B depict yet another example process of data extraction from a PDF file, according to some embodiments.

DETAILED DESCRIPTION OF THE INVENTION

Disclosed are a system, method, and article of manufacture for extracting data from a PDF file. Although the present embodiments have been described with reference to specific example embodiments, it will be evident that various modifications and changes may be made to these embodiments without departing from the broader spirit and scope of the particular example embodiment.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Process

Figure 1:
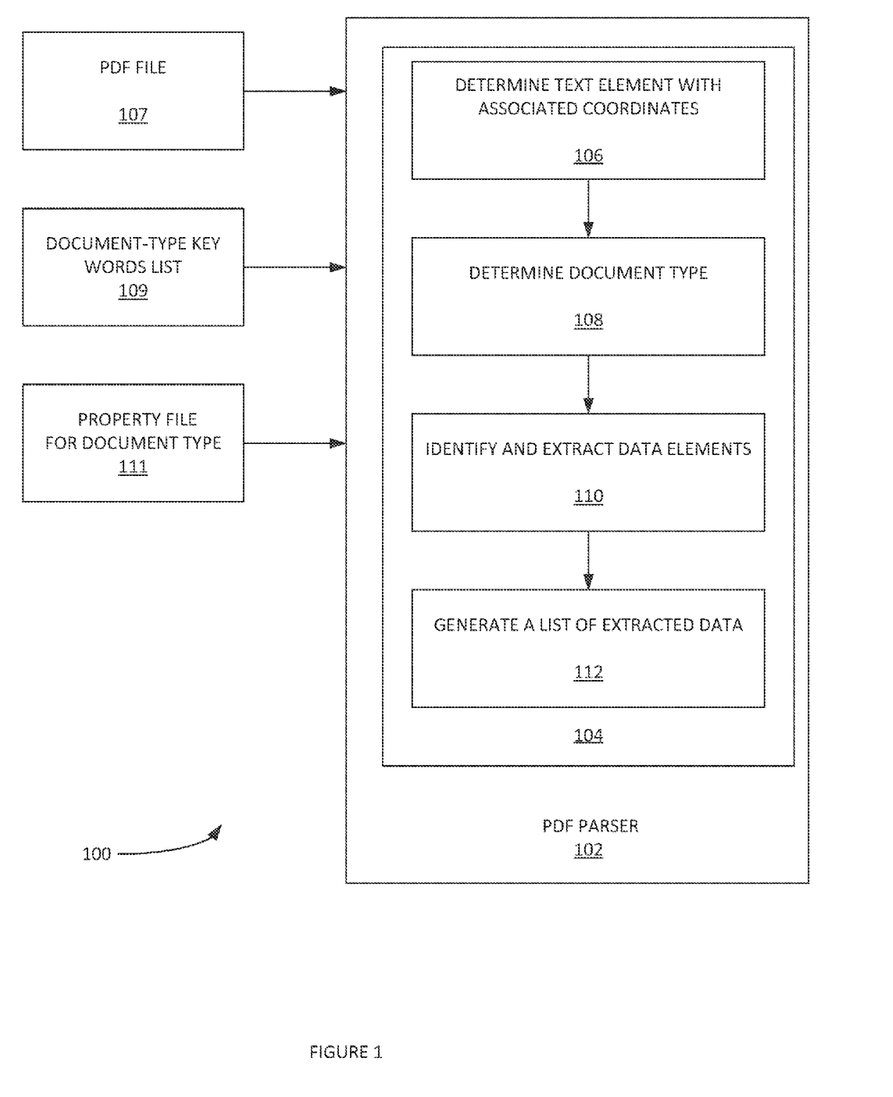
FIG. 1 depicts an example process of data extraction from a PDF file, according to some embodiments.

FIG. 1 depicts an example process 104 of data extraction from a portable document format (PDF) file, according to some embodiments. Process 104 can be performed by data extraction system 100. Data extraction system 100 can include a PDF parser 102. In the present example, PDF parser 102 can be configured to perform process 104. A PDF file can be provided to PDF parser 102. In step 106 of process 104, the text elements of the PDF file are determined along with a coordinate position of each element (see FIG. 2 infra). This data can be provided in various formats such as a text file, table in a word processor file, an XML file and the like.

Figure 2:
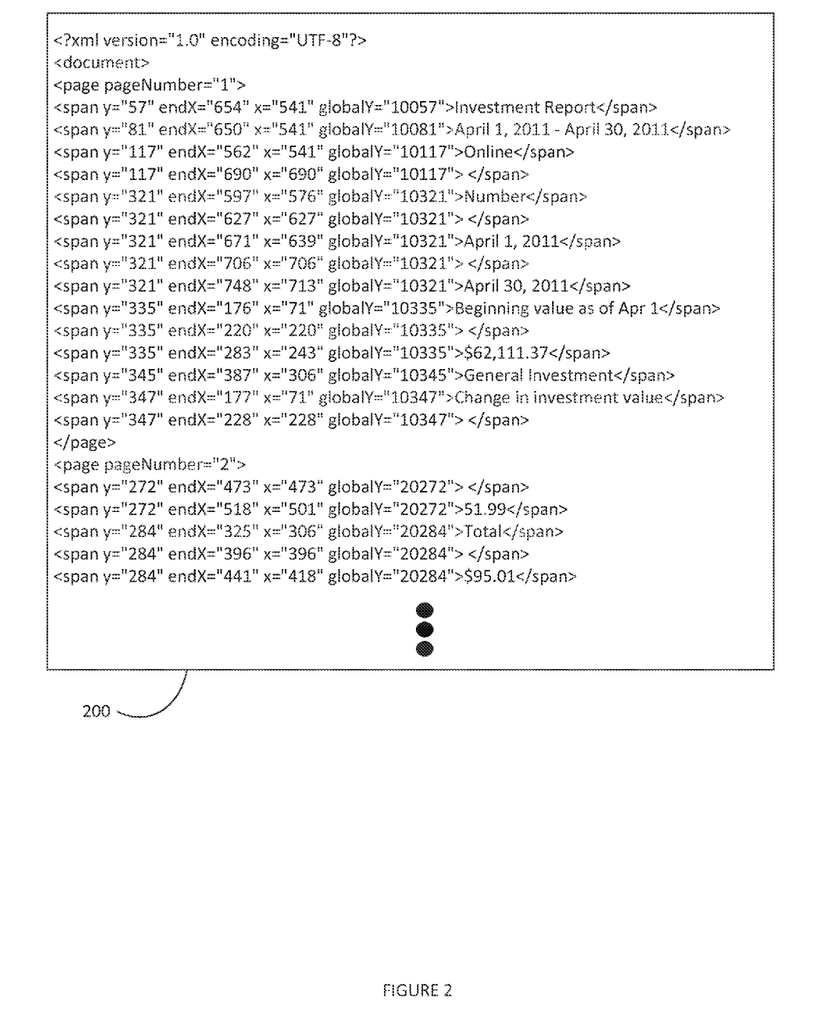
FIG. 2 depicts an example grouping of text elements extracted from a PDF file along with associated coordinates of each text element in an XML file, according to some embodiments.

FIG. 2 depicts an example grouping of text elements extracted from a PDF file along with the associated coordinates of each text element in XML file 200, according to some embodiments. XML file 200 can include various tags. Some tags can have a semantic meaning that describes an attribute of the PDF file. For example, the  tags can denote the start of and end of a page of the PDF file respectively. The beginning page tag can include a 'pageNumber' attribute that provides the page of the PDF file from which the following text elements have been extracted (e.g. pageNumber="2").

Other tags may not provide semantic information about the PDF file but can include information extracted therefrom. For example, the <span></span> tags can denote an extracted text element from the PDF file. Moreover, the <span></span> tags can include various attributes that provide the coordinate position of the associated text element. In the example of FIG. 2, the coordinate position can be depicted with an x,y coordinate format (e.g. a system used to locate a point in two dimensions according to the Cartesian coordinate system). The value an 'x' attribute can represent a measure of a horizontal distance of the first portion of the associated text element. The value the 'endX' attribute can represent a measure of the last horizontal position of the associated text element. The value a 'y' attribute can represent a measure of a vertical distance of the associated text element relative to the beginning of the present page indicated by the 'pageNumber' attribute of the page tag. The value the 'globalY' attribute can represent a measure of a vertical distance of the text element relative to the beginning of the first page of the PDF file. It is noted that, in the present example, the attributes attached to the span element can describe their respective semantic purpose, according to the coordinate measured. For example, the attributes of the span tag can be:

<span y="476" endX="753" x="736" globalY="30476">$3.02</span>

The text element is '$3.02'. These attributes indicate that the y-coordinate position of the text element is '476'. The text element begins at x coordinate '736' and ends at x-coordinate position '753'. Overall, in the PDF file, the y-coordinate position of the text element is at '30476'. This value can indicate that the text element is on the third page of the PDF file. It is noted that the system of FIG. 2 is provided for exemplary purposes only and other embodiments are not limited thereby. For example, other XML formats can include more or less position attributes with other semantic purposes and the like. It is noted that, in some embodiments, XML file 200 can include additional attributes for other information about the text element such as font type, font size, and the like. Text elements can be provided as strings.

Figure 3:
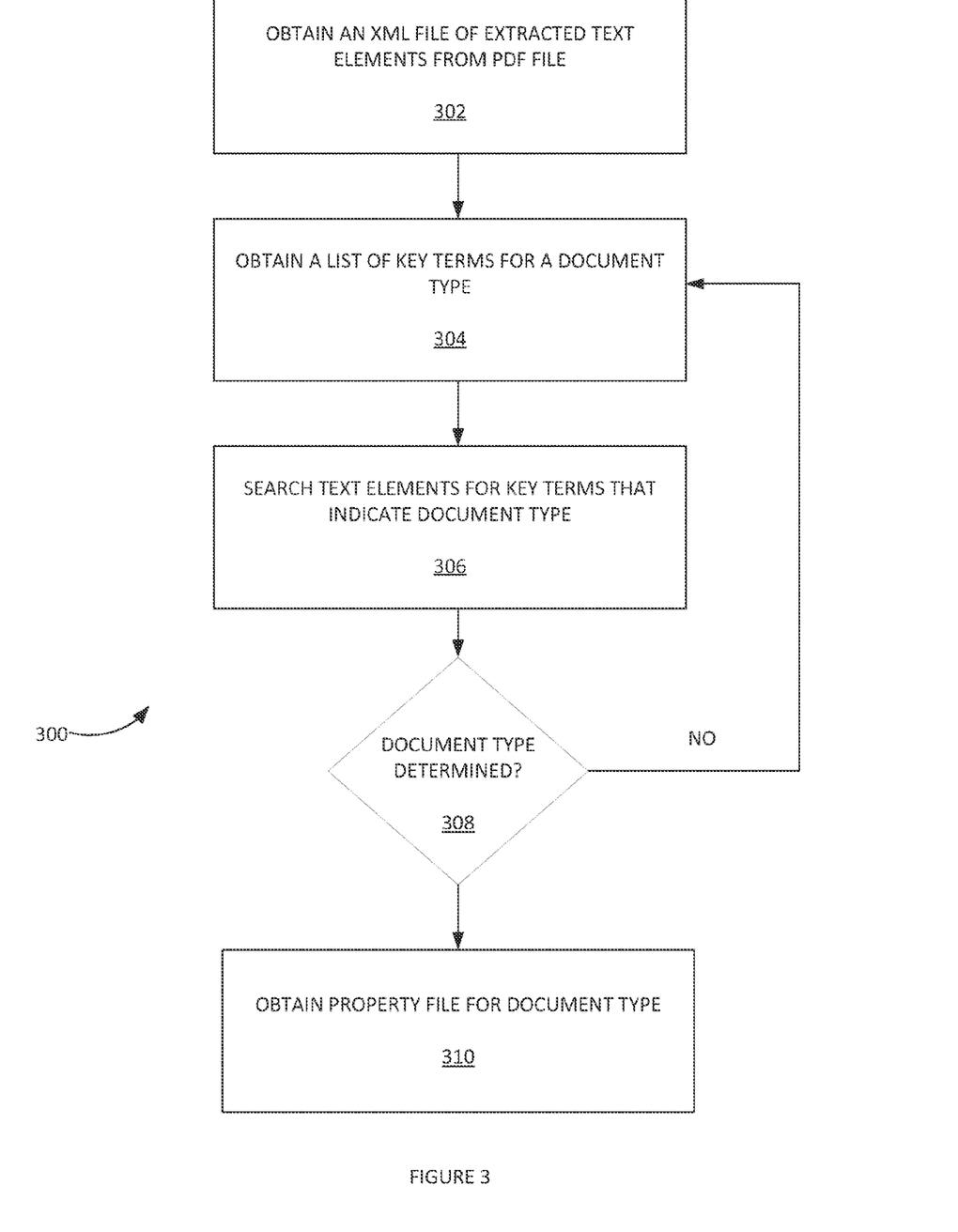
FIG. 3 depicts an example process of determining a document type from an XML file of extracted text elements from a PDF file, according to some embodiments.
Figure 9:
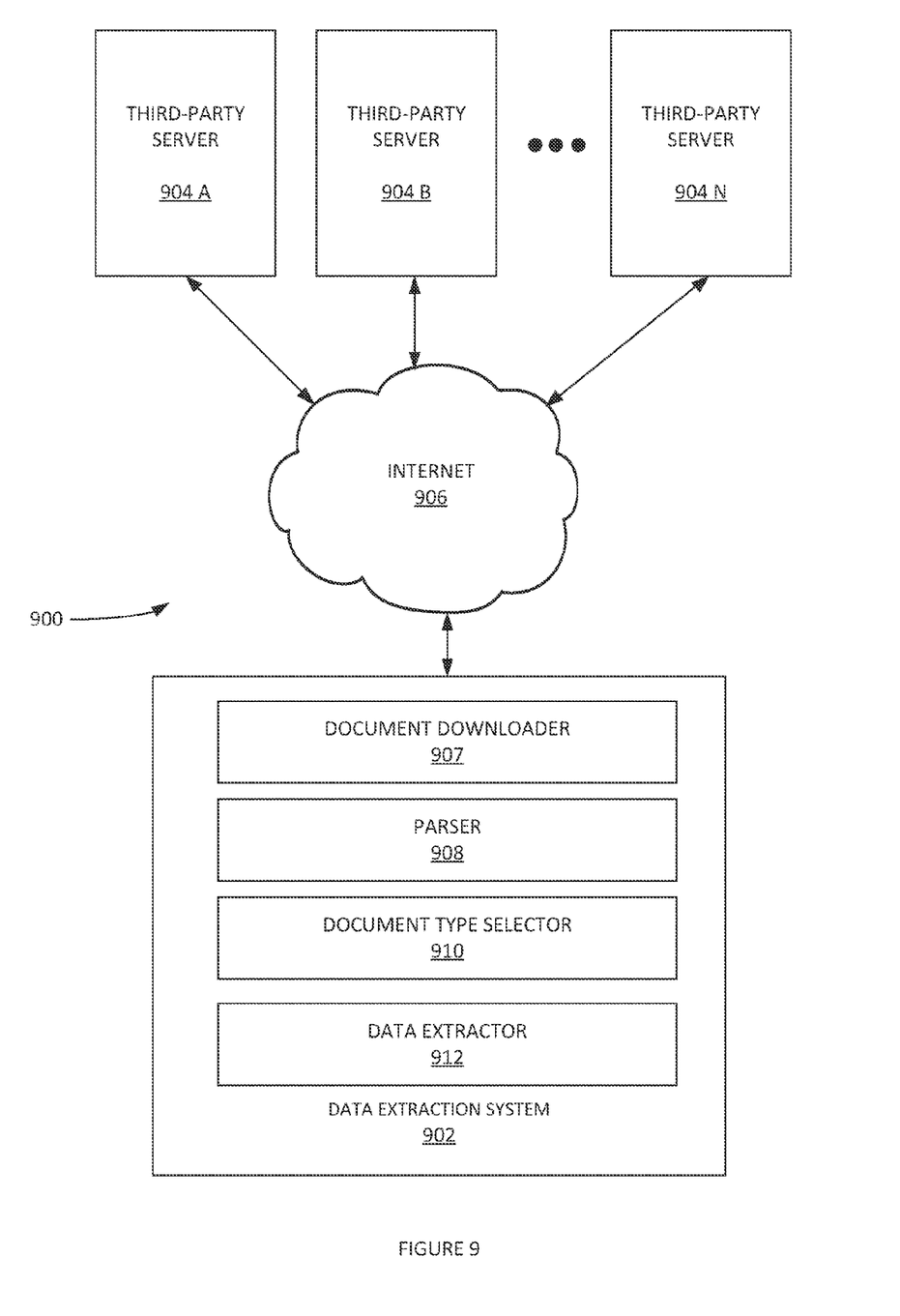
FIG. 9 is a block diagram of an example system for extracting data from a PDF file, according to some embodiments

Returning now to process 104 of FIG. 1, step 108 can include determining a document type of the PDF file. This extracted information can be processed by a document type selector (e.g. document type selector 910 of FIG. 9 provided infra). The document type selector can checks the document for certain keywords and use the results to determine the document type. It is noted that data can be extracted from various document types. Example document types include, inter cilia, utility bills, credit card statements, bank statement, brokerage statement etc. FIG. 3 provides an example process 300 of performing step 108.

More particularly, FIG. 3 depicts an example process 300 of determining a document type from an XML the of extracted text elements from a PDF file, according to some embodiments. In step 302 of process 300, an XML, file of extracted text elements is obtained. For example, the XML file can be XML file 200 of FIG. 2. In step 304, a list of keywords associated with a particular document type is obtained. A system for extracting data from PDF files can include one or more keywords (e.g. document-type key words 109) associated with various document types. The list can be ranked, modified and/or integrated to generate other lists as well. Keywords can be supplied by a system administrator and/or obtained from other sources such as customers, third-parties, entities that provide the PDF file, etc. A keyword list can include synonyms and/or variations of keywords.

Various operations can be performed to determine and rank the various lists of keywords. For example, the list of keywords can be chosen based on a source of the PDF file. For example, if the source of the PDF file is a banking website, then a list of keywords associated with various types of PDF files provided by the banking website can be utilized, such as keywords associated with checking accounts, saving accounts, mortgage accounts, credit card statements, and the like. Once a list of keywords that indicated a document type has been selected, the text elements of the XML file can be searched the keywords in step 306. If a one or more of keywords are located (e.g. within a specified parameter) then a document type can be determined in step 308. If the keywords are not located (e.g. within the specified parameter) then steps 304, 306 and 308 eau be repeated with another list of keywords. For example, another list of keywords that indicates another document type can be selected and another search performed.

Each supported document type can be associated with a particular property file. A property file (such as document-type specific properties file 111) can include a list of properties that are utilized during an extraction operation of data elements. Each property can be associated with a particular data element. A property file can be provided in an XML format. Thus, is step 310, a property file is obtained for the document type of the PDF file (e.g. PDF file 107).

It is noted that a property can define a piece of data (e.g. a data element) to be extracted. A property can include attributes such as a synonym list, regular expression list, data type, pages to search, and the like. A synonym list can include labels and/or text that identify the data to be extracted. For example, if the document is a utility bill, then an example property could be the 'amount due' property. The synonyms for the 'amount due' property can include such expressions as 'Total Amount Due', 'Amount Due', 'Pay This Amount', and the like. The synonyms list includes the actual text that is searched for in the XML file of extracted text elements from the PDF file.

A synonyms list can also include a regular expression list. As used herein, a regular expression can provide a concise and flexible means to "match" (e.g. specify and recognize)

strings of text, such as particular characters, words, or patterns of characters. The regular expression can define the format of the data to be extracted for a particular property. For example, for the 'Amount Due' property, the regular expression would define a dollar amount. Other attributes of the property can include instructions for obtaining a value of the data element defined in the property (e.g. see infra).

Figure 4:
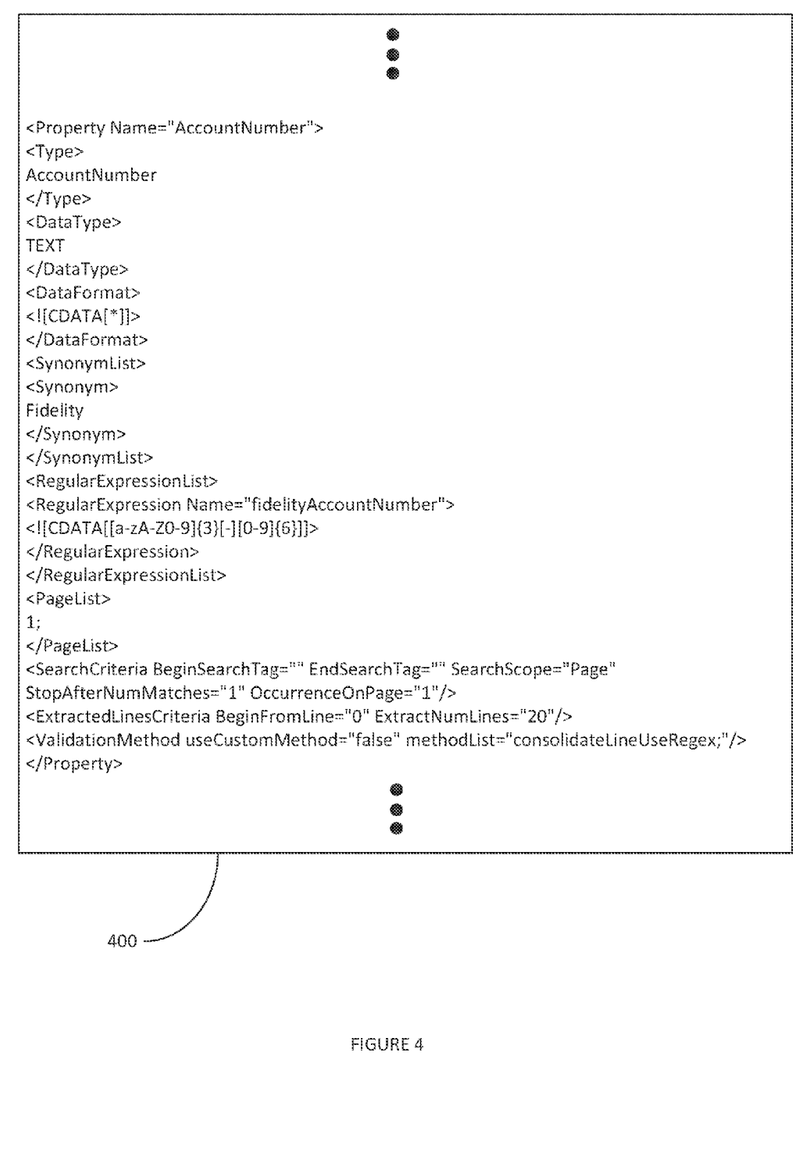
FIG. 4 depicts an example of a property file in XML format, according to some embodiments.

FIG. 4 depicts an example of a property file 400 in XML format, according to some embodiments. Property file 400 includes an 'Account Number' property. A property can be utilized to extract a particular data element such as an account number, for example. Accordingly, in this example, the PDF file document type can be a checking account (e.g. as determined by process 300). Accordingly, property file 400 can be used to extract the account number of the checking account. It is noted that a property file can include more than one property. However, for purposes of simplification, the present example presents only one example property.

FIG. 4, the property is defined between the <Property></Property> tags. The start tag can include an attribute 'Name' that defines the property's name (e.g. <Property Name="AccountNumber">). Other tags can be provided to define various aspects of the property such as, inter cilia, the type of the extracted data element (e.g. using <Type></Type> tags respectively), the data type of the extracted data element (e.g. using <Datatype></Datatype> tags respectively), a list of synonyms for the data element (e.g. using <Synonym></Synonym> tags respectively), regular expression definitions that can be used by a regular expression processor e.g. using <RegularExpressionList></RegularExpressionList> tags respectively), and the like.

As shown, the search criteria can be defined by various attributes included within the SearchCritera tag. The attributes can describe their semantic purpose, for example 'BeginSearchTag', 'EndSearchTag', 'SearchScope', etc. Moreover, the extraction criteria can be defined by various attributes included within the ExtractedLinesCriteria tag. The attributes can describe their semantic purpose, for example 'BeginFromLine', 'ExtractNumLines', etc. Additionally, the extraction validation criteria can be defined by various attributes included within the ValidationMethod tag gain, the attributes can describe their semantic purpose, for example 'useCustomMethod', 'methodList', etc. Another example of the content of a ValidationMethod tag can include: <ValidationMethod useCustomMethod="false" methodList="getAllTextAfterSynonymUseRegex;"/>. In this way, parser 102 can implement a search of the XML file containing the extracted text elements from a PDF file (such as PDF file 107) according to the instructions found in property file 400.

Accordingly, in step 110 of FIG. 1, the data elements can be identified and extracted. A property file can provide one or more properties that include instructions and parameters for identifying and extracting data elements. The property file can be selected according to the document type of the PDF file. For example, a property (not shown in the present example) can identify a particular data element such as a beginning value of an investment account for a calendar period (e.g. April 1 in XML file 200 of FIG. 2). The property for extracting the beginning value of an investment account can be obtained. The property can provide synonyms and regular expressions for identifying the text element in XML file 200. For example, a string 'Beginning value as of April 1' can be located in XML file 200 as a text element. This string can match the synonym and regular expression parameters.

The property can also include instructions for identifying; extracting and/or validating a data element's value from XML file 200. Using the present example, these instructions can include such parameters as a location of the data element's value string relative to the 'Beginning value as of April 1' string location. Other parameters for identifying the data element's value can include a data type described in the string (e.g. numbers, $ symbols, etc.), regular expressions, length of string, various tolerance parameters and the like. The coordinate locations provided in XML file 200 can be used to determine the location of data element's value relative to the 'Beginning value as of April 1' text element. In the present example, the values of the differences between the coordinate location of the 'Beginning value as of April 1' text element and the '$62,111.37' text element can indicate that the latter is a value of the former. This can be validated by validation parameters provided in the property as well. In this way, the data elements representing a beginning value of an investment account—'Beginning value as of April 1' and '$62,111.37' respectively—can be identified, extracted and validated. This data can then be used to generate a list of extracted data in step 112 of process 104.

Figure 5:
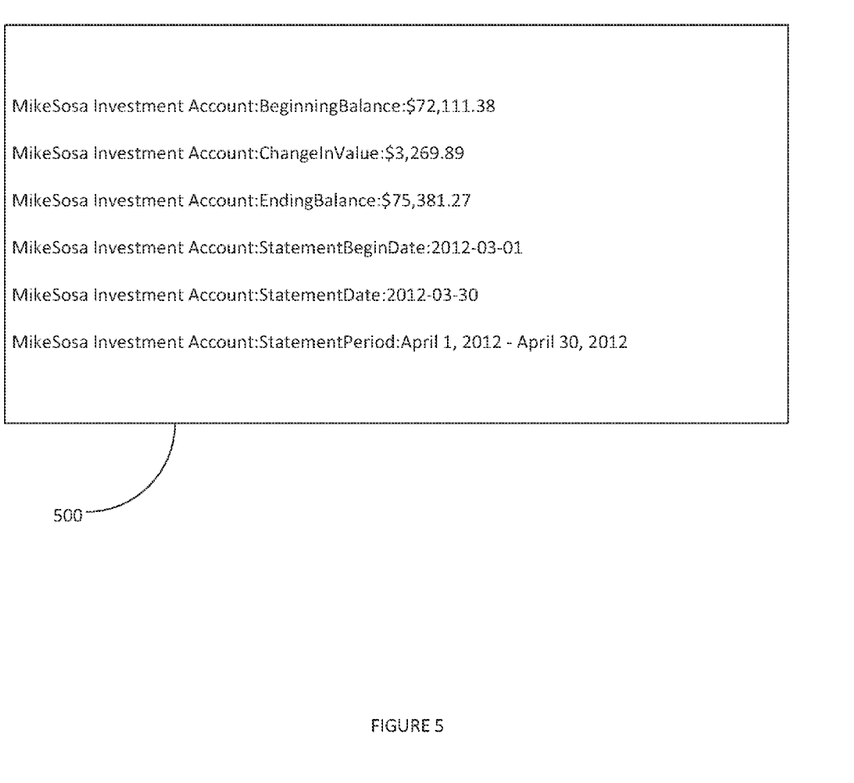
FIG. 5 provides an example of a list of extracted data, accorded to some embodiments.

FIG. 5 provides an example of a list 500 of extracted data provided by step 112, accorded to some embodiments. List 500 can be generated with data obtained from steps 106-110 respectively. For example, the PDF file document type can be determined to be an investment account statement. The data elements to be extracted from the PDF file can be determined from a property file that provides properties for identifying, extracting and validating such information as beginning balance data, change in balance data, ending balance data, statement beginning date data, statement ending, and/or statement period, respectively. Each property can provide various synonyms and regular expressions for each particular data element. Additionally, each property can provide information (e.g. location relative to associated data element text, regular expressions, acceptable data types, and the like) for identifying, extracting and validating an associated data element's value. For example, 'BeginningBalance' can be a synonym of the beginning balance property as provided in a <Synonym></Synonym> tag of an XML property file for beginning balance. The XML, property file can also provide instructions as to the relative location of an expression as well as expression attributes (data type, match with regular expression parameters, etc.) to locate a value for the beginning balance. For example, the instructions can locate the value n coordinate spaces to the right of the end of the text of 'BeginningBalance'. The instructions can indicate that in coordinate spaces of text are to be extracted. In this way, the text of '$72,111.38' can be extracted. The instructions can also indicate validation steps to ensure that the extracted text fits with specified parameters as a valid value of the beginning balance data element. For example, the extracted text can be of a specified length and include specified data types (e.g. include numeric characters, not include alphabet characters, begin with a $-symbol, etc.).

Figure 6:
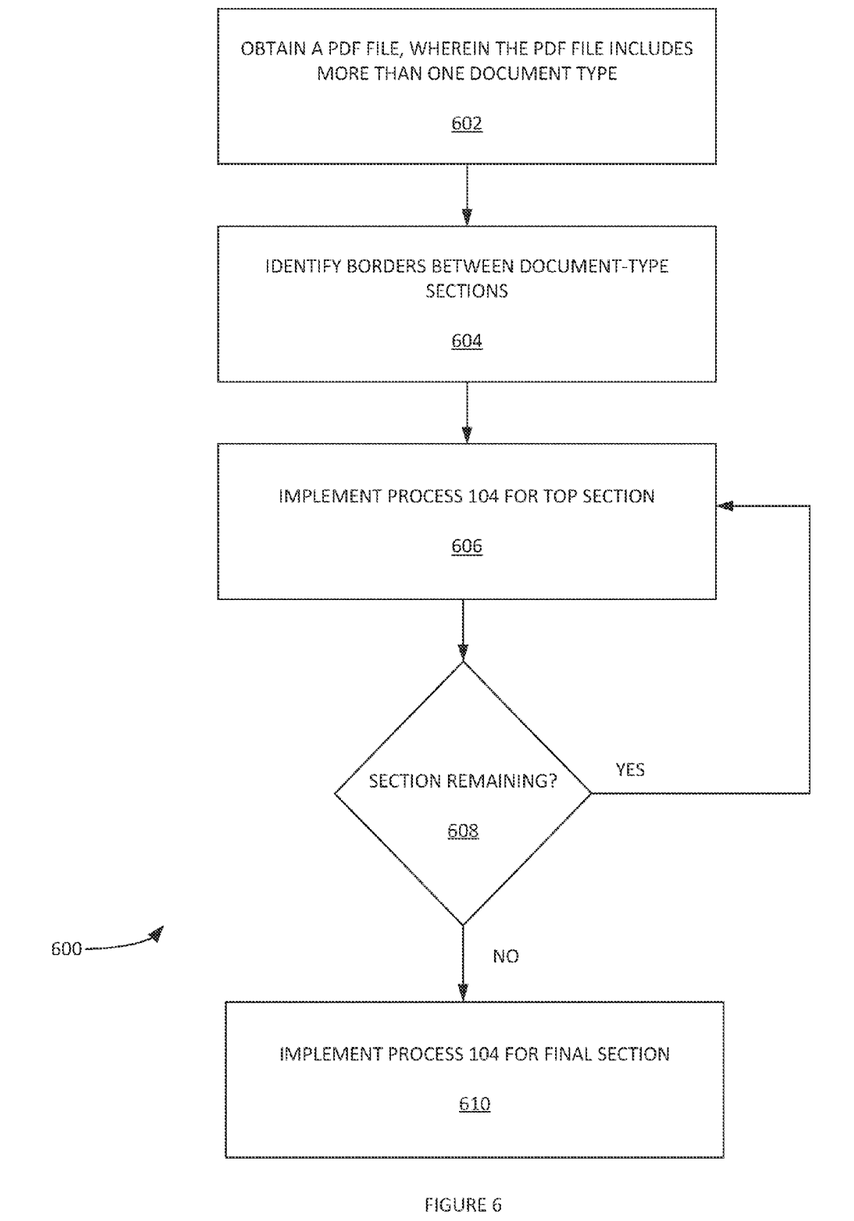
FIG. 6 depicts an example process of data extraction from a consolidated PDF file, according to some embodiments.

It is noted that process 104 can be applied multiple times in the case of a consolidated PDF file that includes more than one document type. Accordingly, FIG. 6 depicts an example process 600 of data extraction from a consolidated PDF file, according to some embodiments. In step 602, a PDF file that includes more than one document type can be obtained. For example, the PDF file can be obtained from a bank and include multiple account information for a user (e.g. a checking account, a savings account and a mortgage account). In step 604, the borders between the document-type sections (e.g. the border between the checking account section and the savings account section) can be identified. The borders can be identified by locating at least one first key word of a first document type and its coordinates. The border can be identified as the coordinate location where a first key word of a second document type appears following the first document type. The border can be defined in terms of a coordinate system such as a one or more y-coordinate types (e.g. a global y-coordinate, a page y-coordinate, etc.). In step 606, process 104 can be implemented for the top document-type section. In step 608, it is determined whether at least one document-type section remains. If 'yes', then step 606 is repeated. If 'no', then, in step 610, process 104 can be implemented for the last document-type section.

Figure 7:
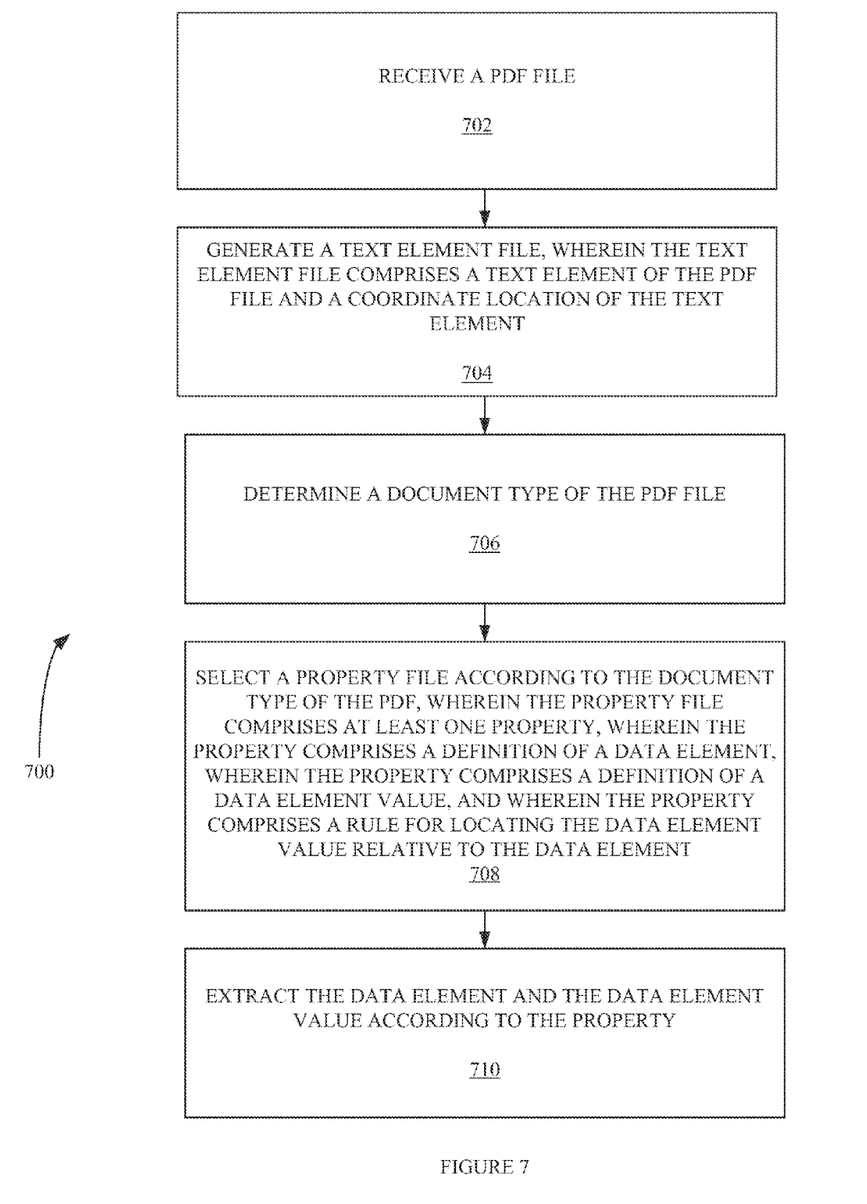
FIG. 7 depicts another example process of data extraction from a PDF file, according to some embodiments.

FIG. 7 depicts another example process 700 of data extraction from a PDF file, according to some embodiments. In step 702 of process, a PDF file is received. In step 704, a text element file is generated. The text element file can include a text element of the PDF file and a coordinate location of the text element, step 706, a document type of the PDF file can be determined. In step 708, a property file can be selected according to the document type of the PDF. The property file can include at least one property. The property can include a definition of a data element to be extracted. The property can include a definition of a data element's value, as well. The property can include a rule for locating the data element's value relative to the data element. In step 701, the data element and the data element's value can be extracted according to the property. It is noted that the steps and methods of FIGS. 1-6 as well as the systems of FIGS. 9-11 can be utilized to implement process 700.

Figure 8A:
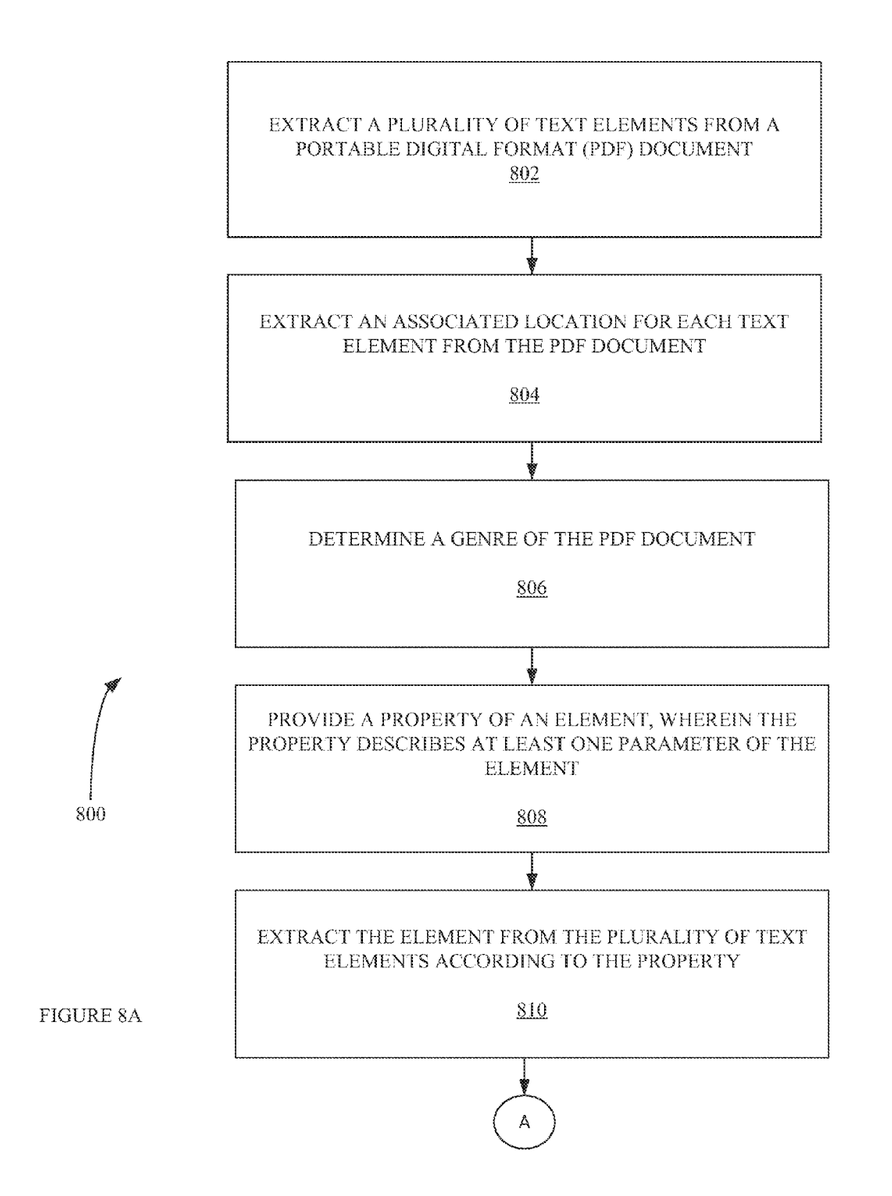
Figure 8B:
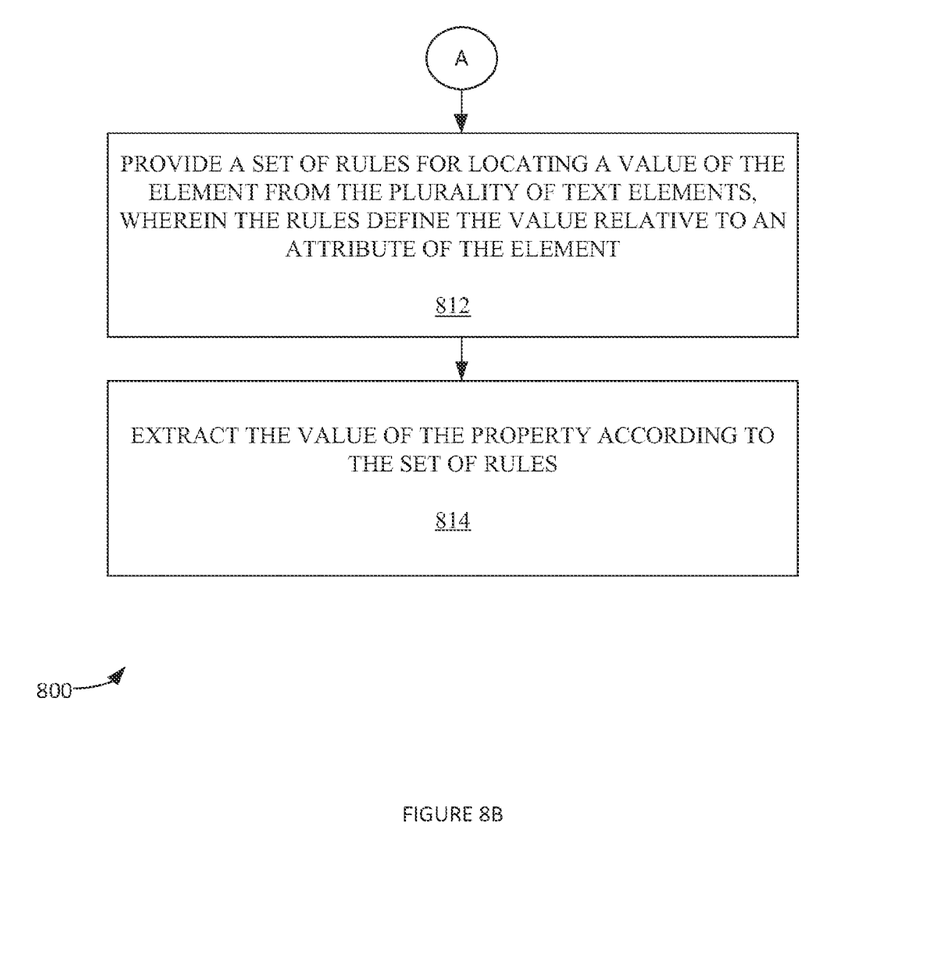

FIGS. 8 A-B depict yet another example process 800 of data extraction from a PDF file, according to some embodiments. In step 802, a plurality of text elements is extracted from a portable digital format (PDF) document. In step 804, an associated location for each text element is extracted from the PDF document. In step 806, a genre of the PDF document is determined. In step 808, a property of an element is provided. The property can describe at least one parameter of the element. In step 810, the element is extracted from the plurality of text elements according to the property. In 812, a set of rules is provided for locating a value of the element from the plurality of text elements. The rules can define the value relative to an attribute of the element. In step 814, the value of the property is extracted according to the set of rules. It is noted that the steps and methods of FIGS. 1-6 as well as the systems of FIGS. 9-11 can be utilized to implement process 800.

Exemplary Environment and Architecture

FIG. 9 is a block diagram of an example system 900 for extracting data from a PDF file, according to some embodiments. System 900 includes data extraction system 902. Data extraction system 902 can extract specified data elements from a PDF file. For example, if a PDF file (e.g. utility bills, credit card statement, bank statement, brokerage statements etc.) is a checking account document, data extraction system 902 can extract data elements as well as corresponding values. Example data elements include various information about the checking account provided in the PDF file such as beginning balance, ending balance, account number, and the like. PDF files can be obtained from third-party servers 904 A-N via the Internet 906 (e.g. with document downloader 907). Third-party servers 904 A-N can be maintained and administered by enterprises such as banks, governmental agencies, utility companies, insurance companies, etc. Data extraction system 902 can include document downloader 907. Document downloader 907 can obtain documents (e.g. PDF files) from third-party servers 904 A-N. Data extraction system 902 can include parser 908. Parser 908 can extract text elements from the PDF file as well as the coordinate values of the text elements. The coordinate values can be with respect to the location of text element in the display of the PDF file with a graphical user interface. Parser 908 can format the text element and associated coordinate position information into a text-element XML file. Data extraction system 902 can include document type selector 910. Document type selector 910 can check the text-element XML file for certain keywords and use the results to determine the document type. Data extraction system 902 can include data extractor 912. Data extractor 912 can obtain a definition of the data elements to be extracted (e.g. a property as discussed supra) according to the document type. Data extractor 912 can obtain a definition of the values of the data elements as well as a set of rules for identifying the data element's values relative to their associated data elements. The data elements and the data element's value can be included in the text elements extracted by parser 908. A rule can include determining a location of a data element's value within a specified distance and direction from data element's position. A rule can further include a set of validation operations to run on a data element's value. For example, a rule can state that a data element's value can be of a certain length threshold, of a specified set of data types, fit within a specified regular expression definition and the like. In this way, the extracted text elements and the rule (e.g. as provided by a data element's property definition) can be used by data extractor 912 to extract the data element and the data element's value. It is noted that, in some embodiments, data extraction system 902 can be implemented with a Java application server, web server, and the like.

Figure 10:
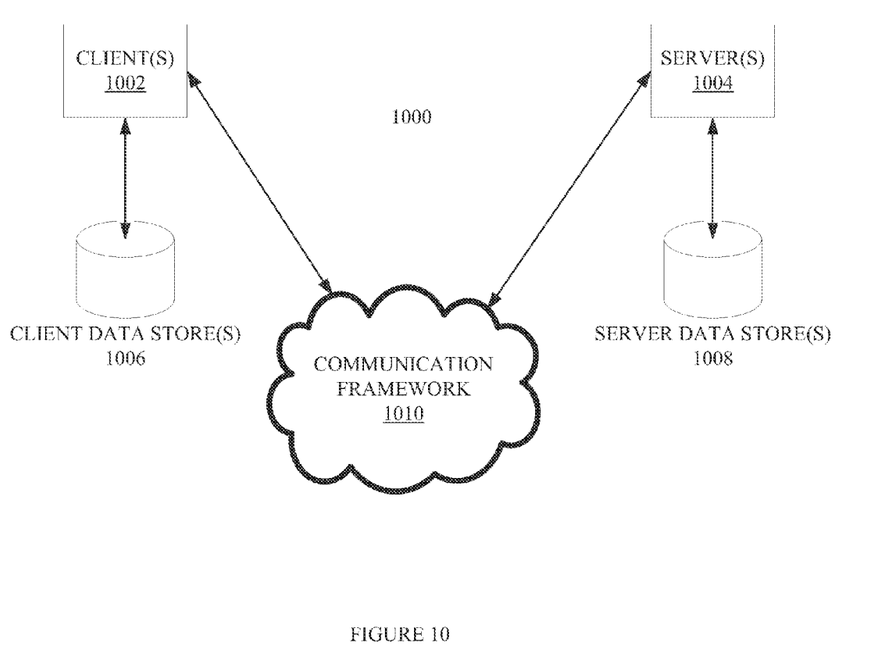
FIG. 10 is a block diagram of a sample computing environment that can be utilized to implement some embodiments.

FIG. 10 is a block diagram of a sample computing environment 1000 that can be utilized to implement some embodiments. The system 1000 further illustrates a system that includes One or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1010 that can be employed to facilitate communications between the client(s) 1002 and the server(s) 1004. The client(s) 1002 are connected to one or more client data store(s) 1006 that can be employed to store information local to the client(s) 1002. Similarly, the server(s) 1004 are connected to one or more server data store(s) 1008 that can be employed to store information local to the server(s) 1004. In some embodiments, system 1000 can be include and/or be utilized by the various systems and/or methods described herein to implement processes 104, 300, 600, 700 and 800.

Figure 11:
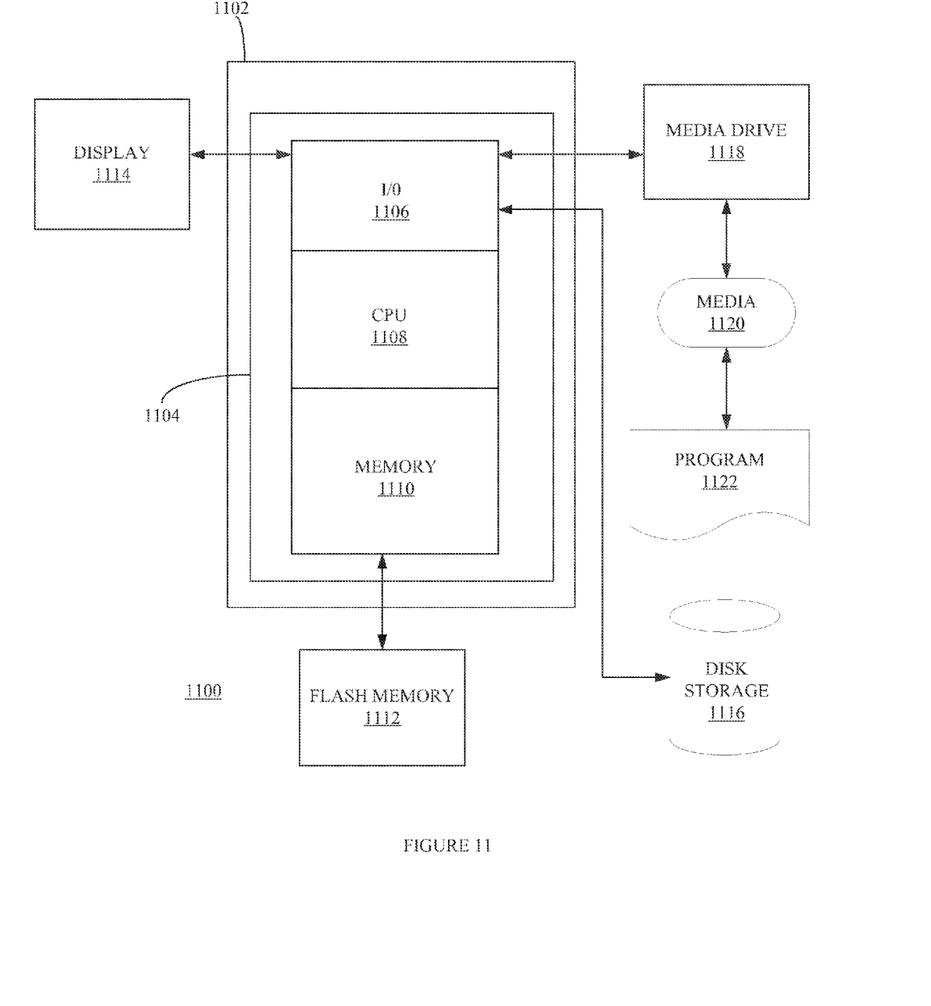
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can be configured as a user's computing device. In some embodiments, system 1100 can be include and/or be utilized by the various systems and/or methods described herein to implement processes 104, 300, 600, 700 and 800.

At least some values based on the results of the above-described processes can be saved for subsequent use. Additionally, a computer-readable medium can be used to store (e.g., tangibly embody) one or more compute programs for performing any one of the above-described processes by means of a computer. The computer program may be written, for example, in a general-purpose programming language (e.g., Pascal, C, C++, Java, Python) or some specialized application-specific language (PHP, Java Script).

B. Conclusion

Although the present embodiments have been described with reference to specific example embodiments, various modifications and changes can be made to these embodiments without departing from the broader spirit and scope of the various embodiments. For example, the various devices, modules, etc, described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be e bodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
   receiving a portable digital format (PDF) file;
   generating a text element file, wherein the text element file comprises one or more text elements of the PDF file and a coordinate location of each of the text elements;
   searching the text element file for a keyword and a coordinate position of the keyword;
   identifying the keyword;
   determining a border of a document-type section with the PDF file, wherein the border of the document-type section comprises the keyword and the coordinate position of the keyword;
   identifying at least one document-type section of the PDF file relative in coordinate location with the border, wherein the document-type section comprises a content section of the PDF file;
   determining a document type of the document-type section based on the keyword;
   selecting a property file according to the document type, wherein the property file comprises at least one property utilized during an extraction of data elements from a version of the document-type section in the text element file, wherein the property comprises a definition of a data element, wherein the property comprises a definition of a data element value, and wherein the property comprises a rule for locating the data element value relative to the data element; and
   extracting the data element and the data element value from the version of the document-type section in the text element file according to the property.

2. The method of claim 1 further comprising:
   generating a data element list, comprising the data element and the data element value.

3. The method of claim 2, further comprising:
   searching the text element file for a synonym of the keyword according to a regular expression delineation.

4. The method of claim 1, wherein the text element the comprises an extensible markup language (XML) file.

5. The method of claim 1, wherein the property file comprises an XML file.

6. The method of claim 5, wherein at least one attribute of the XML file provides a horizontal coordinate location that designates a beginning of an associated text element.

7. The method of claim 1, wherein the property comprises a rule for locating the data element value according to a location of the data element value relative to the coordinate location of the data element.

8. The method of claim 7, wherein the property comprises a rule for locating the data element value according to a match between a font type of the data element value and a font type of the data element.

9. The method of claim 1, wherein the coordinate location comprises a text element location with regards to the display of the text element in the PDF file on a graphical user interface.

10. The method of claim 9, wherein the coordinate location comprises a system used to locate a point in two dimensions according to the Cartesian coordinate system.

11. The method of claim 1, wherein the property comprises a rule for validating the data element value.

12. The method of claim 11, wherein the rule for validating the data element value comprises determining that a length of the data element value falls within a specified length parameter.

13. The method of claim 11, wherein the rule for validating the data element value comprises determining that the data element value fits a validating regular expression.

14. A non-transitory computer readable medium containing program instructions for extracting data from a portable data format (PDF) file, wherein execution of the program instructions by one or more processors of a computer system causes the one or more processors to carry out the steps of:
   receiving a portable digital format (PDF) file;
   generating a text element file, wherein the text element file comprises one or more text elements of the PDF file and a coordinate location of each of the text elements;
   searching the text element file for a keyword and a coordinate position of the keyword;
   identifying the keyword;
   determining a border of a document-type section with the PDF file, wherein the border of the document-type section comprises the keyword and the coordinate position of the keyword;
   identifying at least one document-type section of the PDF file relative in coordinate location with the border, wherein the document-type section comprises a content section of the PDF file;
   determining a document type of the document-type section based on the keyword;

selecting a property file according to the document type, wherein the property file comprises at least one property utilized during an extraction of data elements from a version of the document-type section in the text element file, wherein the property comprises a definition of a data element, wherein the property comprises a definition of a data element value, and wherein the property comprises a rule for locating the data element value relative to the data element; and extracting the data element and the data element value from the version of the document-type section in the text element file according to the property.

15. The computer-readable medium of claim 14, wherein the text element file comprises an extensible markup language (XML) file.

\* \* \* \* \*